United States Patent
Grunert

(10) Patent No.: US 6,658,073 B1
(45) Date of Patent: Dec. 2, 2003

(54) METHOD AND SYSTEM FOR REDUCING JITTER ON CONSTANT RATE DATA TRANSFER BETWEEN ASYNCHRONOUS SYSTEMS

(75) Inventor: Norbert Grunert, Juan-les-Pins (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/454,795

(22) Filed: Dec. 3, 1999

(51) Int. Cl.[7] .............................. H04L 25/00; H04L 7/00
(52) U.S. Cl. ........................................ 375/371; 375/354
(58) Field of Search ................................. 375/371, 373, 375/375, 376, 358, 365, 354; 370/395; 307/475; 331/1

(56) References Cited

U.S. PATENT DOCUMENTS

| | | | | |
|---|---|---|---|---|
| 4,151,485 A | * | 4/1979 | LaFratta | 331/1 |
| 5,012,138 A | * | 4/1991 | Suzuki | 307/475 |
| 5,546,432 A | | 8/1996 | Waters | 375/372 |
| 5,608,765 A | * | 3/1997 | Tanoue | 375/365 |
| 5,708,684 A | * | 1/1998 | Ueda | 375/358 |
| 5,757,872 A | * | 5/1998 | Banu et al. | 375/372 |
| 5,790,543 A | * | 8/1998 | Cloutier | 370/395 |
| 6,088,414 A | * | 7/2000 | Dove et al. | 375/376 |

FOREIGN PATENT DOCUMENTS

| CA | 1302594 | * | 6/1992 | ............ 375/371 |
|---|---|---|---|---|

* cited by examiner

Primary Examiner—Stephen Chin
Assistant Examiner—Sam K. Ahn
(74) Attorney, Agent, or Firm—Peter Zawilski

(57) ABSTRACT

A method and system for reducing data loss in digital communication between asynchronous digital devices. The method includes generating a first data transmission stream using a transmitter device, the first data stream synchronous to a first clock signal. A second data transmission stream is then generated using the transmitter device, wherein the second data transmission stream is a copy of the first data stream with a phase shift. A determination is then made as to whether the phase of the first clock signal is within a predetermined amount of the phase of a receiver clock signal of a receiver device, wherein the receiver clock signal is used by the receiver device to sample received data. The first data stream is transmitted to the receiver device when the phase of the first clock signal differs from the phase of the second clock signal by greater than the predetermined amount. The second data stream is transmitted to the receiver device when the phase of the first clock signal differs from the phase of the receiver clock signal by less than the predetermined amount such that jitter on the first clock signal and the receiver clock signal does not disrupt communication between the transmitter device and the receiver device.

15 Claims, 6 Drawing Sheets

METHOD AND SYSTEM FOR REDUCING JITTER ON CONSTANT RATE DATA TRANSFER BETWEEN ASYNCHRONOUS SYSTEMS

TECHNICAL FIELD

The present invention relates generally to digital information systems. More particularly, the present invention relates to a method and system for rapidly synchronizing two or more digital communications systems.

BACKGROUND ART

The transmission of digital information and data between systems has become an essential part of commonly used systems. With such systems, information content is transmitted and received in digital form as opposed to analog form. Information long associated with analog transmission techniques, for example, television, telephone, music, and other forms of audio and video, are now being transmitted and received in digital form. The digital form of the information allows signal processing techniques not practical with analog signals. In most applications, the user has no perception of the digital nature of the information being received.

Traditional modes of communication often occur in "real time." This is true for both one-way and bi-directional communication systems. For example, a "live" television sports broadcast occurs in real time (one-way). A telephone conversation occurs in real time (bi-directional). Users have come to expect these and other such traditional forms of communication to be error-free and in real time. Thus, digital transmission and reception techniques and systems need to provide for the real time transmission and reception of information with minimum distortion and/or errors.

There is a problem, however, in that digital communication between devices distant from each other usually precludes the availability of identical sampling frequencies. Except for those cases where a distinct clocking hierarchy structure can be defined and a common distributed clock source employed, there will be some difference between the internal clock frequency, and thus the sample rate, of one device (e.g., the transmitter) and the internal clock frequency of the other device (e.g., the receiver).

Prior Art FIG. 1 shows a typical prior art asynchronous digital information transmission and reception system 100. System 100 depicts a first communications device 105 and a second communications device 115. Communications device 105 includes a data register 102 coupled to receive a data input to 103. Data register 102 is coupled to receive a clock signal 104 (FSYNC1). Data register 102 provides data to communications device 115 via transmission line 120. Communications device 115 includes a data register 112 coupled to receive the data on line 120. Data register 112 is coupled to receive an internal clock signal 114 (FSYNC2). The data on line 120 emerges from data register 112 as a data output 113.

As described above, digital communication between devices distant from each other usually precludes the availability of identical sampling frequencies. Consequently, there will be some difference between the internal clock frequencies of the devices. The internal clock frequency of the first device 105 differs from the internal clock frequency of the second device 115 by some small amount. This is depicted in FIG. 1 as device 105 having its own "timing flow" 101 and device 115 having its own timing flow 111, due to both devices having their own internal clocks.

To maintain synchronization between the devices on either side of the communications link 120, synchronization techniques have been developed. In most instances, the synchronization technology is applicable and functions adequately. Consequently, digital communications systems (e.g., digital television, digital telephony, etc.) have proliferated and become widely accepted. The synchronization performance obtainable with conventional, prior art synchronization technology is sufficient to allow most applications (e.g., digital television) to function as intended. However, certain configurations do not allow for such a synchronization. In those configurations, using prior art data transfer methods results in a substantial amount of data loss and distortion.

Referring still to Prior Art FIG. 1, as is well known, when transferring data between totally asynchronous devices (e.g., device 105 and device 115), a certain amount of data loss is unavoidable due to the drifting clocks of the two systems. As soon as the boundaries of the clock signals determining the data transfer speed of each system (e.g., signals 104 and 114) cross each other, data samples will either be repeated or deleted, depending on which of the two systems involved is faster. For example, as depicted in FIG. 1, signal 104 is synchronous to the timing of device 105 (e.g., timing flow 101) and determines the corresponding data rate of device 105. With device 115, signal 114 is synchronous to timing flow 111 and determines its corresponding respective data rate. These data rates are not exactly the same, and hence, the resulting timing relationship drifts.

For example, to illustrate the drifting system clock effect, in a case where signal 104 (FSYNC1) has a frequency of 8 kHz and signal 114 (FSYNC2) has a frequency of 8 kHz-100 ppm, every 10,000th data sample transmitted across communications link 120 will be lost, e.g., one sample in 1.25 s.

In reality, however, a much larger amount of data is lost. This is due to the fact that the timing references of devices 105 and 115 are often jittering because the devices themselves are synchronized to another timing source. In such a case, the repetitive impairment will not only concern a single data sample but rather be a burst of data errors. This happens as soon as the (average) distance between the two timing signals (e.g., signals 104 and 114) is less than peak jitter amplitude. In this case the exact sequence of the timing signals depends only on the jitter characteristics and is in general entirely arbitrary. For any data transfer under these conditions, timing signal 104 can occur earlier or later as timing signal 114 resulting in the sampling the correct data or in the loss/repetition of a sample. This relationship is graphically depicted in prior Art FIG. 2.

Referring now to Prior Art FIG. 2, a timing diagram 200 showing the relationship between signal 104 (FSYNC1)of device 105 and signal 114 (FSYNC2)of device 115 is shown. As depicted in diagram 200, the vertical lines of the horizontal trace of signal 104 and the vertical lines of the horizontal trace of signal 114 show the phase relationship between the two (e.g., rising edge). With respect to signal 104 as a reference, the phase of signal 114 jitters by some amount above and below normal, with some peak amount of jitter. This is shown as the possible positions of FSYNC2 due to jitter 202, in conjunction with a peak jitter 202 (e.g., the shaded region around the rising edges of signal 114). As described above, the small frequency difference between signals 104 and 114 causes a drift between the two. This is depicted in diagram 200 as drift direction 203.

Hence, for example, given a FSYNC1=8 kHz, FSYNC2=8 kHz-100 ppm, and a peak timing jitter of FSYNC2 of 2 us, the operation of system 100 shown in FIG. 1 will result in a repetitive sequence of a non-errored periods data transmission of line 120 of 1.21 sec in length, and (worst case) an error burst of 40 ms, or 320 data samples length. This amount of data loss is quite significant.

Thus, what is required is a system for digital transmission which overcomes the data loss associated with the asynchronous transmission limitations of the prior art. The required system should provide for data transmission and reception which minimize the amount of data loss in the communications between asynchronous digital systems. The required system should be capable of establishing a stable communications link free of error bursts caused by jitter. The present invention provides a novel solution to these requirements.

DISCLOSURE OF THE INVENTION

The present invention provides a method and system for digital transmission which overcomes the data loss associated with the asynchronous transmission limitations of the prior art. The system of the present invention provides for data transmission and reception with a minimum amount of data loss in communications between asynchronous digital systems. The system of the present invention is capable of establishing a stable communications link free of error bursts caused by jitter.

In one embodiment, the present invention is implemented as a digital transmission system for reducing data loss in digital communication between asynchronous digital devices. In this embodiment, the asynchronous digital devices include a transmitter device communicating with a receiver device via a communications channel. Within the transmitter device, a first data stream is generated using the device's internal clock signal and is synchronous to this clock signal. This data stream comprises the information to be transmitted to the receiver device. In addition to the first data stream, a second data stream is also generated by the transmitter device. The second data stream is a copy of the first data stream but is delayed by a predetermined number of degrees in phase (e.g., preferably 180 degrees).

To facilitate a stable communications link free of error bursts, the transmitter device monitors the internal clock signal of the receiver device. The transmitter device monitors the phase of the receiver device's clock signal in order to determine whether the phase of the receiver device's clock signal is too close to the phase of the transmitter device's clock signal. The frequencies of the two clock signals might be very close, but not exactly the same due to the fact that the transmitter device and the receiver device are asynchronous. Hence, the phase relationship of the two clock signals drifts over time.

The present embodiment defines a phase "decision window" centered around, for example, the rising edge of the transmitter device clock signal. When the phase of the receiver device clock signal is outside the decision window, the transmitter device transmits the first data stream to the receiver device. When the phase of the receiver device clock signal is within the decision window, the transmitter device transmits the second, 180 degree delayed, data stream to the receiver device. The system transmits either the first or second data streams depending upon the phase relationship of devices clock signals. In this manner, jitter on the receiver device and transmitter device clock signals does not disrupt communication between the transmitter device and the receiver device.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

BEST MODE FOR CARRYING OUT THE INVENTION

Reference will now be made in detail to the preferred embodiments of the invention, a method and system for reducing jitter on constant rate data transfer between asynchronous systems, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not unnecessarily to obscure aspects of the present invention.

The present invention provides a method and system for digital transmission which overcomes the data loss associated with the asynchronous transmission limitations of the prior art. The system of the present invention provides for data transmission and reception with a minimum amount of data loss in communications between asynchronous digital systems. The system of the present invention is capable of establishing a stable communications link free of error bursts caused by jitter. The present invention and its benefits are further described below.

Figure 1:
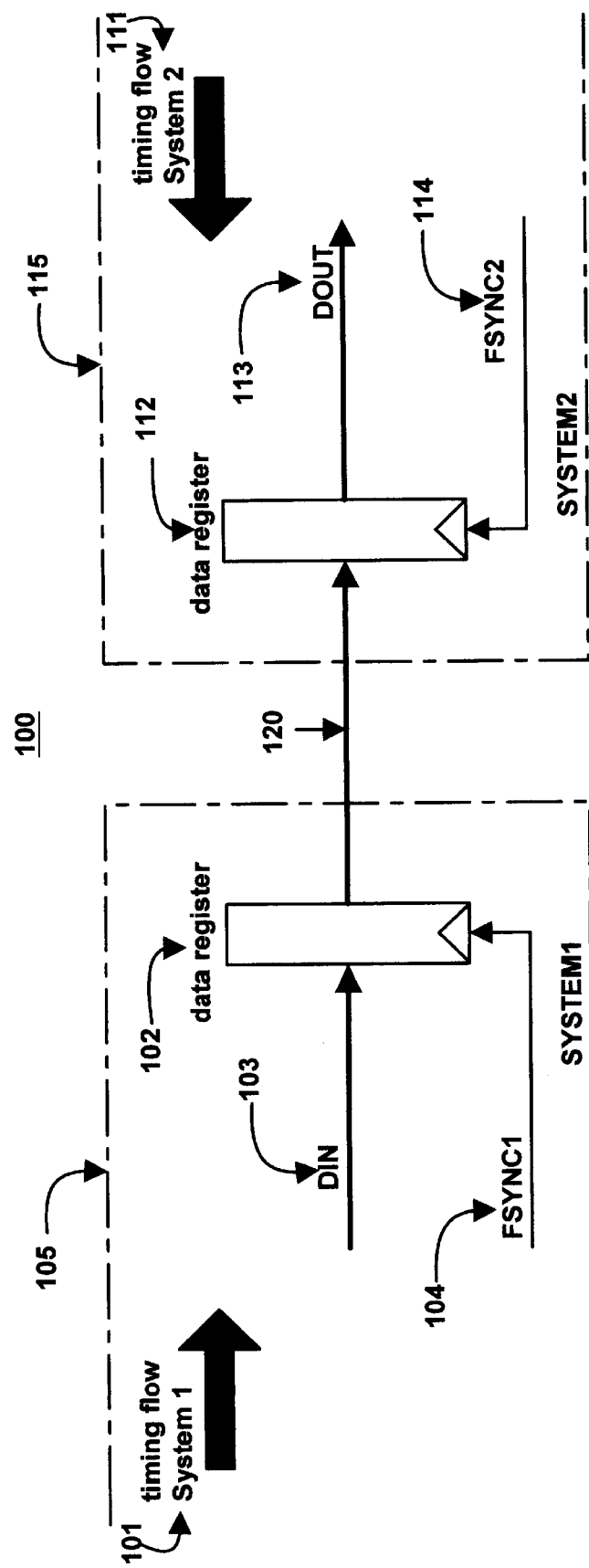
FIG. 1 shows a typical prior art asynchronous digital communications system.
Figure 2:
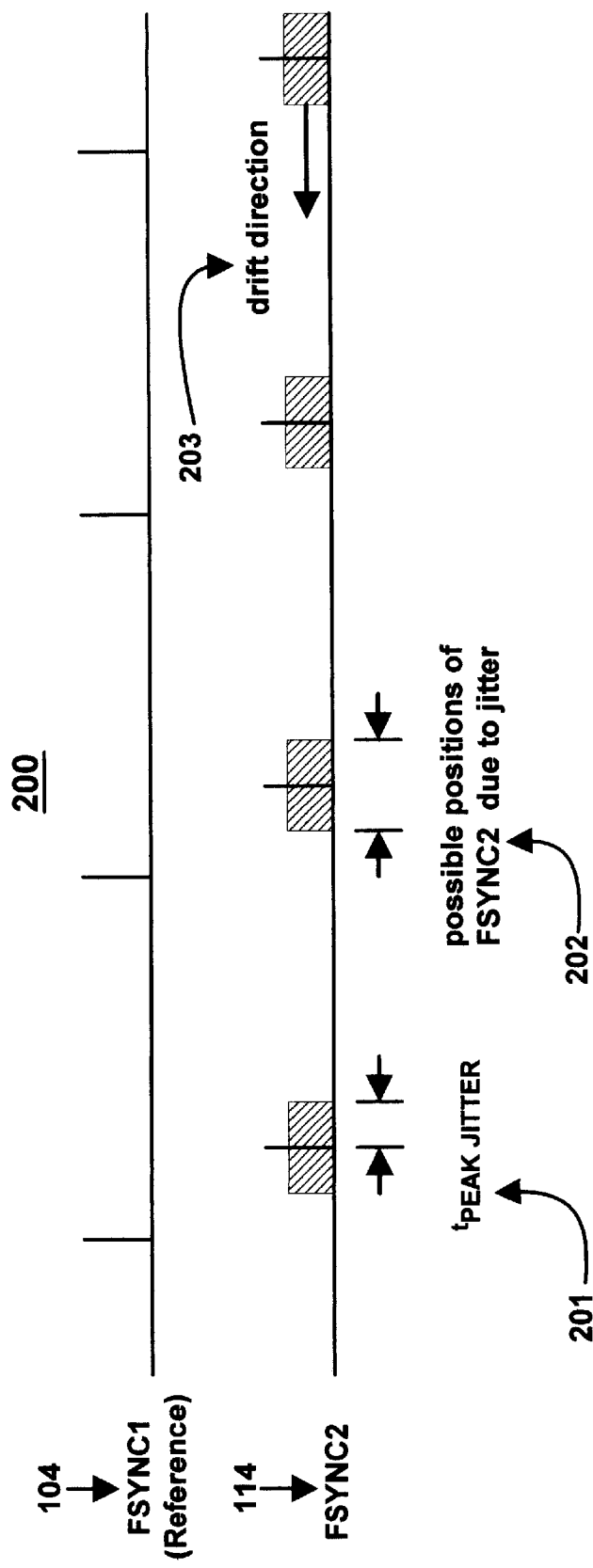
FIG. 2 shows a timing diagram of the clock signal phase relationships of the prior art digital communications system of FIG. 1.
Figure 3:
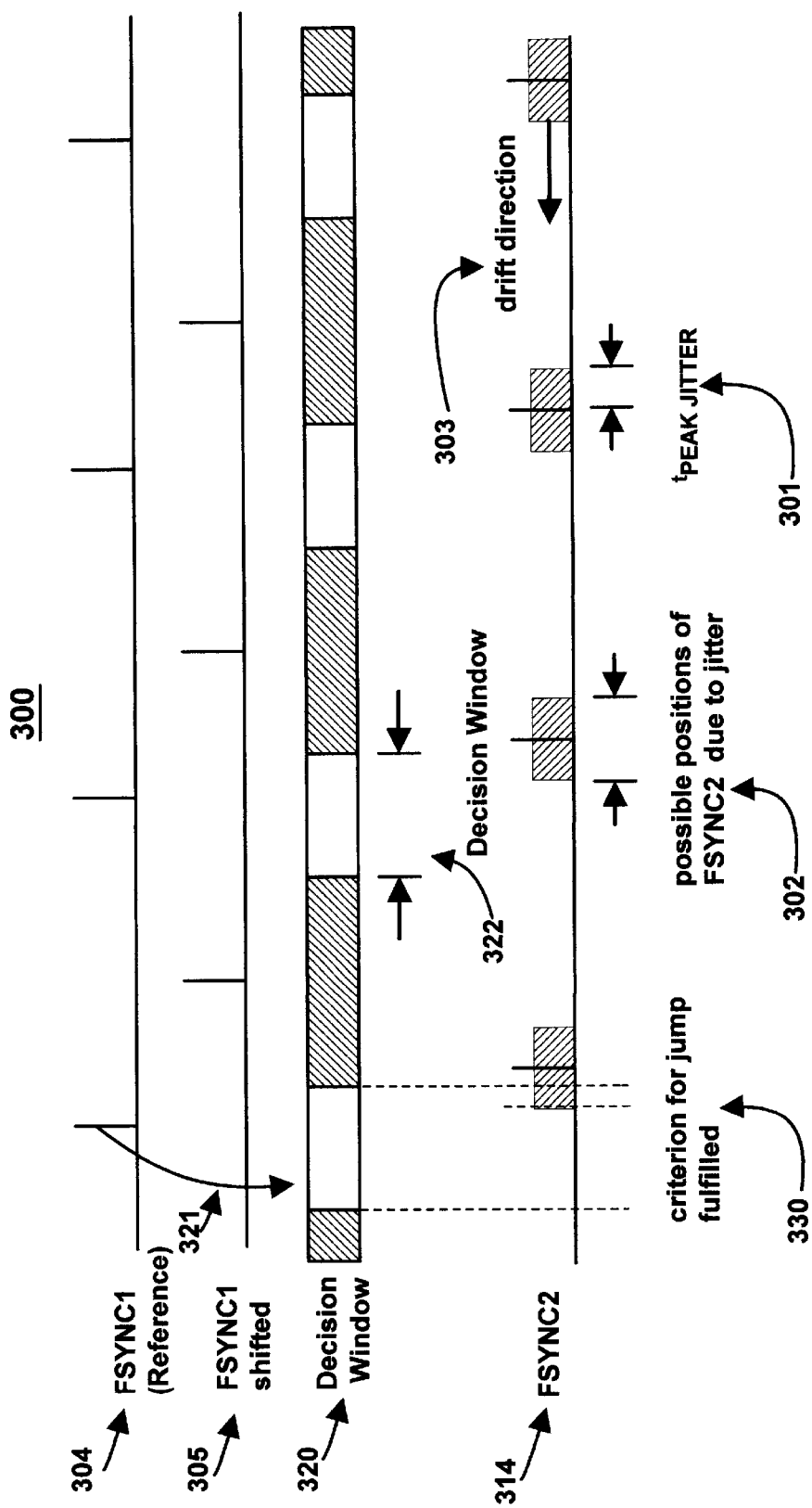
FIG. 3 shows a timing diagram of a digital communications method in accordance with one embodiment of the present invention.

Referring now to FIG. 3, a timing diagram 300 depicting a communications process in accordance with one embodiment of the present invention is shown. As depicted in FIG. 3, timing diagram 300 shows the relationship between a clock signal 304 (FSYNC1) of a transmitter device (e.g., device 501 of FIG. 5), a 180 degree phase shifted clock signal 305 (FSYNC1 shifted) of the transmitter device, and a clock signal 314 (FSYNC2) of a receiver device (e.g., device 502 of FIG. 5). As depicted in diagram 300, the vertical lines of the horizontal trace of signals 304–305 and the vertical lines of the horizontal trace of signal 314 show the phase relationship between them (e.g., rising edge). Timing diagram 300 also shows a decision window trace 320 showing the relative phase of the decision windows (e.g., decision window 322) with respect to signals 304–305 and 314.

With respect to signal 314 as a reference, the phase of signal 314 jitters by some amount above and below normal, with some peak amount of jitter. This is shown as the possible positions of FSYNC2 due to jitter 302, in conjunction with a peak jitter 301 (e.g., the shaded region around the rising edges of signal 314). As described above, the small frequency difference between signals 304 and 314 causes a drift between the two. This is depicted in diagram 200 as drift direction 303.

Referring still to FIG. 3, the present embodiment functions in part by latching, or otherwise temporarily storing, the outgoing data from the transmitter device with FSYNC1 shifted by 180 degrees (e.g., FSYNC1 shifted 305) and sending either the original data stream (synchronous with FSYNC1 304) or the second, latched data stream (synchronous with FSYNC1 shifted 305), depending on the phase relationship between the two timing signals FSYNC1 304 and FSYNC2 314.

As shown by the trace of decision window 320, a respective timing window (e.g., decision window 322) is defined around the edge of the currently used timing signal, FSYNC1 304 or FSYNC1 shifted 305. The criterion as to whether to use FSYNC1 304 or FSYNC1 shifted 305 to send the data from the transmitter device is occurrence of FSYNC2 314 within the decision window. This is shown by line 330 indicating the criterion for jump being fulfilled.

For example, as shown in diagram 300, the currently used timing signal is FSYNC1 304. The criterion for making a jump is fulfilled as shown by arrow 330, since the possible positions of FSYNC2 due to jitter 302 is within the limits of the decision window 322. This avoids the possibility of jitter on FSYNC1 304 and FSYNC2 314 causing error bursts. In so doing, the timing of the transmitter device will not drift too close to the data sampling of the receiver device, timed by FSYNC2 314, thus reducing the error bursts down to single data errors.

Thus, in the present embodiment, the transmitter device generates a first data stream using FSYNC1 304 and a second data stream using FSYNC1 shifted 305. The transmitter device monitors the internal clock signal of the receiver device, FSYNC2 314, in order to determine whether the phase of FSYNC2 314 is too close to the phase of the transmitter device's clock signal. As described above, the frequencies of the two clock signals might be very close, but not exactly the same due to the fact that the transmitter device and the receiver device are asynchronous with respect to each other. Hence, the phase relationship of the two clock signals drifts over time. When the phase of FSYNC2 314 is outside the decision window (including the possible positions due to jitter), the transmitter device transmits the first data stream to the receiver device. When the phase of the receiver device clock signal is within the decision window, the transmitter device transmits the second, 180 degree delayed, FSYNC1 shifted 305 data stream to the receiver device. In this manner, jitter on the receiver device and transmitter device clock signals does not disrupt communication between the transmitter device and the receiver device.

Figure 4:
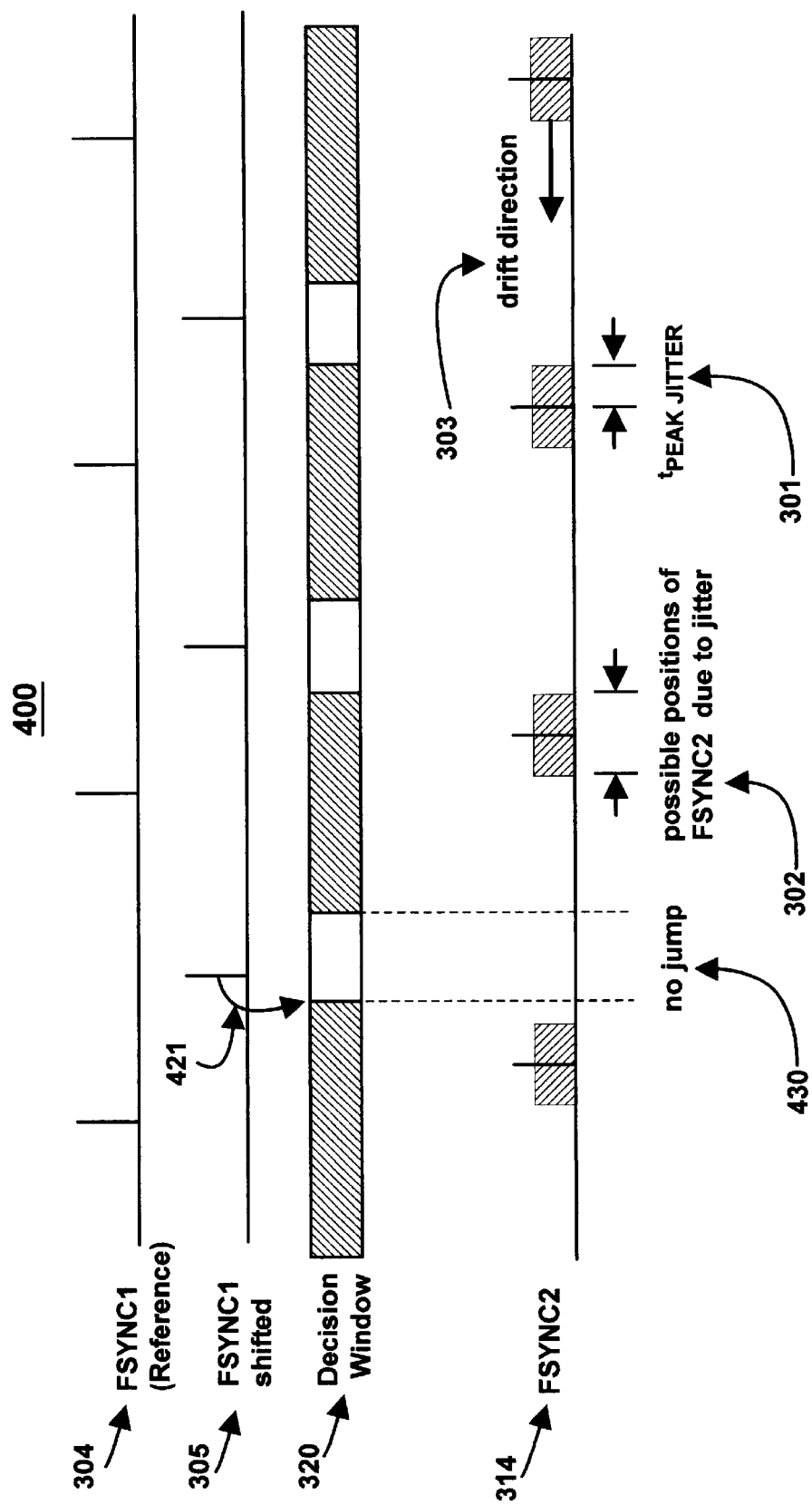
FIG. 4 shows a second timing diagram of a digital communications method in accordance with one embodiment of the present invention.

With reference now to FIG. 4, a timing diagram 400 depicting a communications process in accordance with one embodiment of the present invention is shown. As with FIG. 3, FIG. 4 depicts timing diagram 400 showing the relationship between clock signal 304 (FSYNC1), the 180 degree phase shifted clock signal 305 (FSYNC1 shifted), and clock signal 314 (FSYNC2). Timing diagram 400 also shows a decision window trace 320 showing the relative phase of the decision windows (e.g., decision window 322) with respect to signals 304–305 and 314. However, timing diagram 400 depicts the case where no jump is indicated by the phase relationship between FSYNC1 304 and FSYNC2 314, as would result immediately after a jump is made.

Timing diagram 400 shows the manner in which the decision window is reconfigured after a jump such that it is now centered around the 180 degree phase shifted signal FSYNC1 shifted 305. Once a jump is made to FSYNC1 shifted 305, the decision window 320 is used to determine when a subsequent jump needs to be made back to FSYNC1 304. In this case, when the phase of FSYNC2 314 is outside the decision window (including the possible positions due to jitter), the transmitter device transmits the second data stream to the receiver device. This is indicated by arrow 421 showing a decision window centered around FSYNC1 shifted. Hence in this case, when the phase of the receiver device clock signal is outside the decision window, the transmitter device transmits the second, 180 degree delayed, FSYNC1 shifted 305 data stream to the receiver device. When drift causes the possible position s of FSYNC2 302 to be within decision window 320, another jump is made back to the original clock signal FSYNC1 304. In this manner, the present embodiment alternates between the data streams clocked by FSYNC1 304 and FSYNC1 shifted 305, thereby ensuring jitter on the receiver device and transmitter device clock signals does not disrupt communication.

Figure 5:
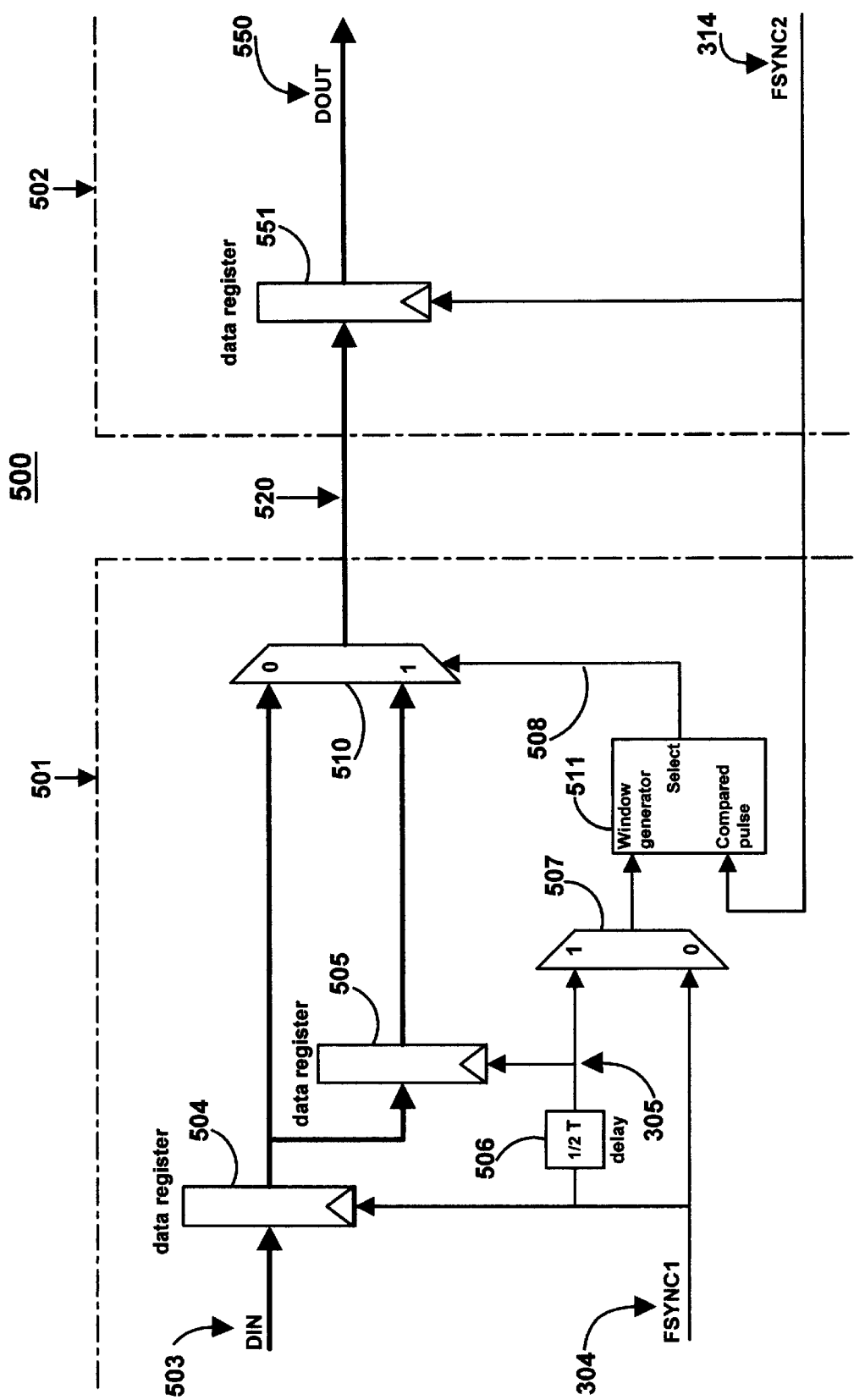
FIG. 5 shows a block diagram of the components of a digital communications system in accordance with one embodiment of the present invention.

Referring now to FIG. 5, a block diagram of a communications system 500 in accordance with one embodiment of the present invention is shown. As depicted in FIG. 5, System 500 shows the components and configuration of one possible implementation of the present invention. It should be appreciated by those skilled in the art that other configurations are possible in accordance with the particular requirements of the application.

System 500 includes a transmitter device 501 and a receiver device 502. Data is transmitted from device 501 to device 502 via a communications channel 520. The transmitter device 501 includes a data input 503 coupled to a first data register 504. The output of register 504 is the first data stream clocked by FSYNC1 304. The output of register 504 is coupled to a second data register 505 and a multiplexer 510. A delay element 506 is coupled to receive FSYNC1 304 and produce the 180 degree phase delayed clock signal FSYNC1 shifted 305. Signal 305 is coupled to register 505 to produce the second data stream. The second data stream from register 505 is coupled to multiplexer 510. A window generator 511 (e.g., a phase comparator) is coupled to receive either FSYNC1 304 or FSYNC1 shifted 305 via multiplexer 507, and is also coupled to receive FSYNC2 314 from receiver device 502. A select output 508 of window generator is used to control multiplexer 510 to send either the first or the second data stream via channel 520.

Thus, the first data stream from register 504 or the second data stream from register 505 is selected by window generator 511 for transmission via multiplexer 510. Window generator 511 makes the determination in the manner described above, based on the phase relationship between FSYNC1 304, FSYNC1 shifted 305, and FSYNC2 314.

Figure 6:
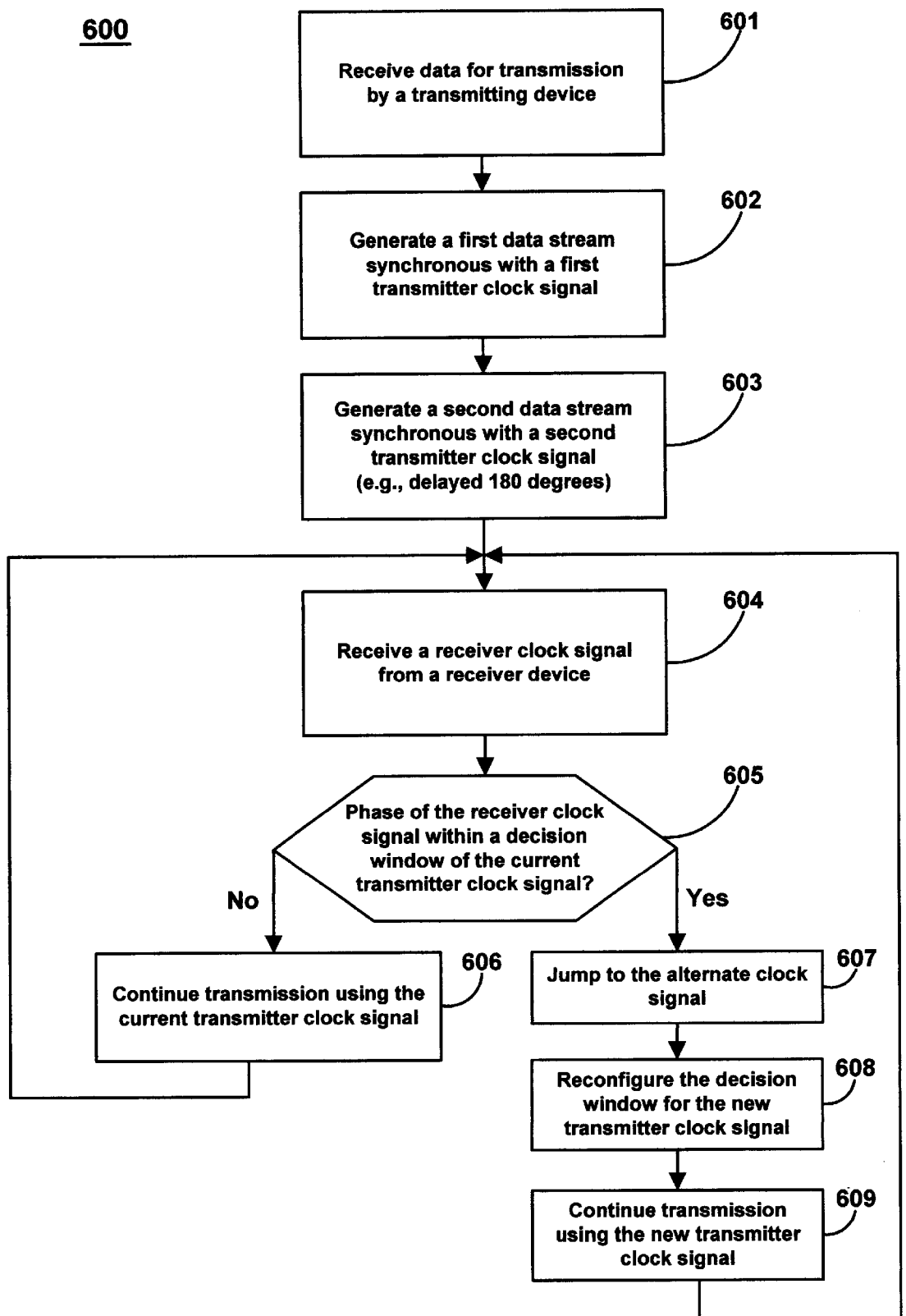
FIG. 6 shows a flow chart of the steps of a process in accordance with one embodiment of the present invention.

The receiver device 502 includes a data register 551 for receiving either the first or second data streams via channel 520. Data register 551 is clocked by FSYNC2 314. This yields the resulting output 550. As described above, FSYNC2 314 is coupled to the transmitter device 501 for comparison. With reference now to FIG. 6, a flow chart of the steps of a process 600 in accordance with one embodiment of the present invention is shown. Process 600 depicts the operating steps of a communications system in accordance with one embodiment of the present invention (e.g., communications system 500 of FIG. 5).

Process 600 begins in step 601, where a transmitter device (e.g., transmitter device 501 of FIG. 5) receives data for transmission to a receiver device 502. As described above, the transmitter device is communicatively coupled to the receiver device via a communications channel 520.

In step 602, a first data stream is generated within the transmitter device. The first data stream is synchronous with a first transmitter clock signal.

In step 603, a second data stream is generated within the transmitter device. The second data stream is synchronous with a second transmitter clock signal. As described above, the second transmitter clock signal is a delayed, phase shifted version of the first transmitter clock signal (e.g., 180 degree phase shifted). Accordingly, the second data stream is a delayed, phase shifted version of the first data stream.

In step 604, the transmitter device receives a receiver clock signal from the receiver device (e.g., receiver device 502 of FIG. 5). As described above, the transmitting device is communicatively coupled to receive the receiver clock signal. The receiver clock signal is used by the receiver device to sample incoming data from the transmitter device.

In step 605, the phase of the receiver clock signal is compared with a decision window of the current transmitter clock. As described above, the current transmitter clock is either the first clock signal (e.g., FSYNC1 304) or the second clock signal (e.g., FSYNC1 shifted 305). The decision window is centered around the current clock signal. When the receiver clock signal (e.g., FSYNC2 314) drifts within the decision window, the transmitter jumps to an alternate clock signal, which ever of the first clock signal or the second clock signal not currently in use, and the corresponding data stream. Initially, the current clock signal will be the first clock signal (FSYNC1 304).

In step 606, where the phase of the receiver clock is not within the decision window, transmission with the current clock continues using the current clock signal. Process 600 then proceeds back to step 604, such that the phase of the receiver clock is monitored for violation of the decision window.

In step 607, where the phase of the receiver clock is within the decision window, a jump is made to the alternate clock signal, and the corresponding data stream.

In step 608, the decision window is reconfigured for the new transmitter clock signal (which becomes the "new" current clock signal). As described above, a window generator (e.g., window generator 511 of FIG. 5) centers the decision window around the new transmitter clock signal.

In step 609, transmission continues using the new transmitter clock signal. In this manner, the new transmitter clock signal (e.g., either of FSYNC1 304 or FSYNC1 shifted 305) becomes the current clock signal. Process 600 then proceeds back to step 604, such that the phase of the receiver clock is monitored for violation of the decision window.

Thus, the present invention provides a method and system for digital transmission which overcomes the data loss associated with the asynchronous transmission limitations of the prior art. The system of the present invention provides for data transmission and reception with a minimum amount of data loss in communications between asynchronous digital systems. The system of the present invention is capable of establishing a stable communications link free of error bursts caused by jitter.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for reducing data loss in digital communication between asynchronous digital devices, the method comprising the steps of:
   a) generating a first data transmission stream using a transmitter device, the first data stream synchronous to a first clock signal;
   b) generating a second data transmission stream using the transmitter device, wherein the second data transmission stream is a copy of the first data stream with a phase shift;
   c) determining whether the phase of the first clock signal is within a predetermined amount of the phase of a receiver clock signal of a receiver device, wherein the receiver clock signal is used by the receiver device to sample received data;
   d) transmitting the first data stream to the receiver device when the phase of the first clock signal differs from the phase of the receiver clock signal by greater than the predetermined amount; and
   e) transmitting the second data stream to the receiver device when the phase of the first clock signal differs from the phase of the receiver clock signal by less than the predetermined amount such that jitter on the first clock signal and receiver clock signal does not disrupt communication between the transmitter device and the receiver device.

2. The method of claim 1 further including the step of the transmitter device receiving the receiver clock signal from the receiver device to determine whether the phase of the first clock signal is within the predetermined amount of the phase of the receiver clock signal.

3. The method of claim 1 further including the step of generating the second data stream using a second clock signal wherein the second clock signal is a phase shifted version of the first clock signal.

4. The method of claim 3 further including the step of using a decision window having predetermined limits to determine whether the phase of the first clock signal is within a predetermined amount of the phase of the receiver clock signal.

5. The method of claim 4 further including the steps of:
   reconfiguring the decision window around the second clock signal when the second data stream is being sent to the receiver device;
   using the decision window to determine whether the phase of the second clock signal is within a predetermined amount of the phase of the receiver clock signal; and
   transmitting the first data stream to the receiver device when the phase of the second clock signal differs from the phase of the receiver clock signal by less than the predetermined amount.

6. In a digital communications system including a transmitter device and a receiver device, a method for reducing data loss in asynchronous digital communication between the receiver device and the transmitter device, the method comprising the transmitter device performing the steps of:

a) generating a first data transmission stream, the first data stream synchronous to a first clock signal;

b) generating a second data transmission stream, wherein the second data transmission stream is a copy of the first data stream with a phase shift;

c) receiving a receiver clock signal from a receiver device to determine whether the phase of the first clock signal is within the predetermined amount of the phase of the receiver clock signal e) determining whether the phase of the first clock signal is within a predetermined amount of the phase of the receiver clock signal, wherein the receiver clock signal is used by the receiver device to sample received data;

f) transmitting the first data stream to the receiver device when the phase of the first clock signal differs from the phase of the receiver clock signal by greater than the predetermined amount; and g) transmitting the second data stream to the receiver device when the phase of the first clock signal differs from the phase of the receiver clock signal by less than the predetermined amount such that jitter on the first clock signal and receiver clock signal does not disrupt communication between the transmitter device and the receiver device.

7. The method of claim 6 wherein the phase shift is 180 degrees.

8. The method of claim 6 further including the step of generating the second data stream using a second clock signal wherein the second clock signal is a phase shifted version of the first clock signal.

9. The method of claim 8 further including the step of using a decision window having predetermined limits to determine whether the phase of the first clock signal is within a predetermined amount of the phase of the receiver clock signal.

10. The method of claim 9 further including the steps of:

reconfiguring the decision window around the second clock signal when the second data stream is being sent to the receiver device;

using the decision window to determine whether the phase of the second clock signal is within a predetermined amount of the phase of the receiver clock signal; and transmitting the first data stream to the receiver device when the phase of the second clock signal differs from the phase of the receiver clock signal by less than the predetermined amount.

11. A digital communications system for reducing data loss in asynchronous digital communication between a transmitter device and a receiver device, comprising:

a first data register in the transmitter device for generating a first data transmission stream, the first data stream synchronous to a first clock signal;

a second data register in the transmitter device for generating a second data transmission stream, wherein the second data transmission stream is a copy of the first data stream with a phase shift; and a phase comparator unit in the transmitter device for receiving a receiver clock signal from the receiver device to determine whether the phase of the first clock signal is within the predetermined amount of the phase of the receiver clock signal, the phase comparator unit configured to determine whether the phase of the first clock signal is within a predetermined amount of the phase of the receiver clock signal, wherein the receiver clock signal is used by the receiver device to sample received data;

the phase comparator unit coupled to control the first data register and the second data register such that the transmitter device transmits the first data stream to the receiver device when the phase of the first clock signal differs from the phase of the receiver clock signal by greater than the predetermined amount transmits the second data stream to the receiver device when the phase of the first clock signal differs from the phase of the receiver clock signal by less than the predetermined amount such that jitter on the first clock signal and receiver clock signal does not disrupt communication between the transmitter device and the receiver device.

12. The system of claim 11 wherein the phase shift is 180 degrees.

13. The system of claim 11 wherein the second data stream is generated by the second data register using a second clock signal wherein the second clock signal is a phase shifted version of the first clock signal.

14. The system of claim 13 wherein the phase comparator unit is a window generator for defining a decision window having predetermined limits to determine whether the phase of the first clock signal is within a predetermined amount of the phase of the receiver clock signal.

15. The system of claim 14 wherein the window generator is adapted to configure the decision window around the second clock signal when the second data stream is being sent to the receiver device such that the decision window is used to determine whether the phase of the second clock signal is within a predetermined amount of the phase of the receiver clock signal, and such that the first data stream is transmitted to the receiver device when the phase of the second clock signal differs from the phase of the receiver clock signal by less than the predetermined amount.

\* \* \* \* \*